United States Patent
Fay et al.

(10) Patent No.: US 11,611,790 B2
(45) Date of Patent: Mar. 21, 2023

(54) RF CHANNEL DESCRIPTION FOR MULTIPLE FREQUENCY NETWORKS

(71) Applicant: Sony Group Corporation, Tokyo (JP)

(72) Inventors: Luke Fay, San Diego, CA (US); Adam Goldberg, San Diego, CA (US); Graham Clift, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/525,750

(22) Filed: Nov. 12, 2021

(65) Prior Publication Data

US 2023/0048702 A1 Feb. 16, 2023

Related U.S. Application Data

(60) Provisional application No. 63/260,191, filed on Aug. 12, 2021, provisional application No. 63/260,012, filed on Aug. 6, 2021.

(51) Int. Cl.
| | |
|---|---|
| *H04N 21/41* | (2011.01) |
| *H04N 21/43* | (2011.01) |
| *H04N 21/61* | (2011.01) |
| *H04N 21/414* | (2011.01) |
| *H04N 21/4363* | (2011.01) |
| *H04H 20/71* | (2008.01) |

(Continued)

(52) U.S. Cl.
CPC ...... *H04N 21/41407* (2013.01); *H04H 20/71* (2013.01); *H04N 21/43637* (2013.01); *H04N 21/643* (2013.01); *H04W 72/0453* (2013.01); *H04W 72/085* (2013.01)

(58) Field of Classification Search
CPC ....... H04N 21/41407; H04N 21/43637; H04N 21/643; H04H 20/71; H04W 72/0453; H04W 72/085
See application file for complete search history.

(56) References Cited

U.S. PATENT DOCUMENTS

| | | | |
|---|---|---|---|
| 4,169,226 A | 9/1979 | Fukuji | |
| 4,804,972 A | 2/1989 | Schudel | |

(Continued)

FOREIGN PATENT DOCUMENTS

| | | |
|---|---|---|
| CN | 1941868 B | 5/2010 |
| EP | 0689307 B1 | 10/2002 |

(Continued)

OTHER PUBLICATIONS

"ATSC Standard: A/300:2021, ATSC 3.0 System", Doc. A/300:2021, Jul. 7, 2021.

(Continued)

*Primary Examiner* — Alazar Tilahun
(74) *Attorney, Agent, or Firm* — John L. Rogitz

(57) ABSTRACT

Techniques are described for expanding and/or improving the Advanced Television Systems Committee (ATSC) 3.0 television protocol in robustly delivering the next generation broadcast television services. An ATSC3.0 service list table (SLT) contains correlations between service IDs and frequencies so that a receiver receiving duplicate services on different frequencies in a boundary between broadcast regions can select the best frequency to tune to in order to present the service, without having to access a database to correlate service IDs to frequencies.

20 Claims, 6 Drawing Sheets

(51) Int. Cl.
*H04W 72/0453* (2023.01)
*H04N 21/643* (2011.01)
*H04W 72/08* (2009.01)

(56) References Cited

U.S. PATENT DOCUMENTS

| | | |
|---|---|---|
| 5,528,253 A | 6/1996 | Franklin |
| 6,023,242 A | 2/2000 | Dixon |
| 6,072,440 A | 6/2000 | Bowman |
| 6,538,612 B1 | 3/2003 | King |
| 6,832,070 B1 | 12/2004 | Perry et al. |
| 6,904,609 B1 | 6/2005 | Pietraszak et al. |
| 7,075,492 B1 | 7/2006 | Chen et al. |
| 7,076,202 B1 | 7/2006 | Billmaier |
| 7,194,753 B1 | 3/2007 | Fries et al. |
| 7,239,274 B2 | 7/2007 | Lee et al. |
| 7,472,409 B1 | 12/2008 | Linton |
| 7,685,621 B2 | 3/2010 | Matsuo |
| 7,865,930 B2 | 1/2011 | Kim |
| 8,290,492 B2 | 10/2012 | Lu et al. |
| 3,368,611 A1 | 2/2013 | King et al. |
| 8,787,237 B2 | 7/2014 | Väre et al. |
| 9,548,826 B2 | 1/2017 | Kitazato et al. |
| RE46,304 E | 2/2017 | Kim et al. |
| 10,904,791 B2 | 1/2021 | Naik et al. |
| 10,938,511 B2 | 3/2021 | Kwak et al. |
| 10,939,180 B2 | 3/2021 | Yang et al. |
| 2003/0051246 A1 | 3/2003 | Wilder et al. |
| 2003/0214449 A1 | 11/2003 | King |
| 2004/0128689 A1 | 7/2004 | Pugel et al. |
| 2004/0227655 A1 | 11/2004 | King |
| 2005/0108751 A1 | 5/2005 | DaCosta |
| 2005/0193415 A1 | 9/2005 | Ikeda |
| 2005/0225495 A1 | 10/2005 | King |
| 2006/0020978 A1 | 1/2006 | Miyagawa |
| 2006/0139499 A1 | 6/2006 | Onomatsu et al. |
| 2006/0184962 A1 | 8/2006 | Kendall et al. |
| 2006/0187117 A1 | 8/2006 | Lee et al. |
| 2007/0152897 A1 | 7/2007 | Zimmerman et al. |
| 2008/0129885 A1 | 6/2008 | Yi et al. |
| 2008/0186242 A1 | 8/2008 | Shuster et al. |
| 2008/0186409 A1 | 8/2008 | Kang et al. |
| 2008/0273497 A1 | 11/2008 | Lu et al. |
| 2009/0135309 A1 | 5/2009 | DeGeorge et al. |
| 2009/0260038 A1 | 10/2009 | Acton et al. |
| 2009/0310030 A1 | 12/2009 | Litwin et al. |
| 2010/0118197 A1 | 5/2010 | Kim |
| 2010/0214482 A1 | 8/2010 | Kang |
| 2010/0235858 A1 | 9/2010 | Muehlbach |
| 2010/0315307 A1 | 12/2010 | Syed et al. |
| 2011/0126232 A1 | 5/2011 | Lee et al. |
| 2012/0133840 A1 | 5/2012 | Shirasuka et al. |
| 2013/0207868 A1 | 8/2013 | Venghaus et al. |
| 2015/0161236 A1 | 6/2015 | Beaumont et al. |
| 2015/0161249 A1 | 6/2015 | Knox et al. |
| 2015/0162897 A1 | 6/2015 | Zachara |
| 2015/0189376 A1 | 7/2015 | Bazata |
| 2015/0382217 A1 | 12/2015 | Odio Vivi et al. |
| 2016/0014571 A1 | 1/2016 | Lee et al. |
| 2016/0173945 A1 | 6/2016 | Oh et al. |
| 2016/0255394 A1 | 9/2016 | Fang et al. |
| 2016/0330525 A1 | 11/2016 | Freeman et al. |
| 2017/0064528 A1 | 3/2017 | Daly et al. |
| 2017/0317408 A1 | 11/2017 | Hamada et al. |
| 2017/0318353 A1 | 11/2017 | Petruzzelli et al. |
| 2017/0318502 A1 | 11/2017 | Singh et al. |
| 2017/0374421 A1 | 12/2017 | Yim et al. |
| 2018/0048854 A1 | 2/2018 | Kwak et al. |
| 2018/0120169 A1 | 5/2018 | Jackson et al. |
| 2018/0139495 A1 | 5/2018 | Eyer |
| 2018/0270539 A1* | 9/2018 | Kim ............... H04W 4/06 |
| 2018/0359541 A1 | 12/2018 | Park et al. |
| 2019/0037418 A1 | 1/2019 | Gunasekara et al. |
| 2019/0079659 A1 | 3/2019 | Adenwala et al. |
| 2019/0215575 A1* | 7/2019 | Yang ............... H04N 21/23605 |
| 2019/0335221 A1 | 10/2019 | Walker et al. |
| 2019/0373305 A1 | 12/2019 | Yang et al. |
| 2020/0077125 A1 | 3/2020 | An et al. |
| 2020/0169775 A1 | 5/2020 | Clift |
| 2020/0297955 A1 | 9/2020 | Shouldice |
| 2020/0305003 A1 | 9/2020 | Landa et al. |
| 2020/0367316 A1 | 11/2020 | Cili et al. |
| 2021/0337543 A1* | 10/2021 | Das ............... H04B 10/25752 |
| 2022/0256232 A1 | 8/2022 | Pesin et al. |

FOREIGN PATENT DOCUMENTS

| | | |
|---|---|---|
| EP | 2061166 A2 | 5/2009 |
| EP | 2068470 A2 | 6/2009 |
| EP | 2187530 A4 | 12/2011 |
| EP | 3340636 A4 | 1/2019 |
| JP | 2012049853 A | 3/2012 |
| JP | 5372342 B2 | 12/2013 |
| JP | 2020010249 A | 1/2020 |
| KR | 100824606 B1 | 4/2008 |
| KR | 20080069826 A | 7/2008 |
| KR | 1020080069826 A | 7/2008 |
| KR | 20190139454 A | 12/2019 |
| KR | 20210001101 A | 1/2021 |

OTHER PUBLICATIONS

"ATSC Standard: ATSC 3.0 Interactive Content", Doc. A/344:2021, Mar. 23, 2021.

"ATSC Standard: Physical Layer Protocol", Doc. A/322:2021, Jan. 20, 2021.

"ATSC Standard: Signaling, Delivery, Synchronization, and Error Protection", Doc. A/331:2017, Dec. 6, 2017.

"TRINOVA Boss—Manual", Televes, www.televes.com.

"TV Motion: TriMotion + TriNova Boss", Televes, Jul. 2015.

"TVmotion system", Televes, retrieved on Sep. 8, 2021 from https://www.televes.com/me/g-006-tvmotion-system.html.

Ahn et al., "ATSC 3.0 for Future Broadcasting: Features and Extensibility", Set International Journal of Broadcast Engineering, 2020 retrieved from https://web.archive.org/web/20201227132053id_/https://set.org.br/jbe/ed6/Artigo2.pdf.

ATSC Standard: Signaling, Delivery, Synchronization, and Error Protection, Doc. A/331:2021, Jan. 19, 2021.

B. Lee, K. Yang, S. -j. Ra and B. Bae, "Implementation of ATSC 3.0 Service Handoff," 2020 International Conference on Information and Communication Technology Convergence (ICTC), 2020, pp. 1429-1432, doi: 10.1109/ICTC49870.2020.9289581.

Clift et al., "Techniques for ATSC 3.0 Broadcast Boundary Area Management Using Complete Service Reception During Scan to Determine Signal Quality of Frequencies Carrying the Duplicate Service", file history of related U.S. Appl. No. 17/488,258, filed Sep. 28, 2021.

Clift et al., "Techniques for ATSC 3.0 Broadcast Boundary Area Management Using Plural Tuners Handing Off Between Presentation and Scanning", file history of related U.S. Appl. No. 17/489,675, filed Sep. 29, 2021.

Clift et al., "Techniques for ATSC 3.0 Broadcast Boundary Area Management Using Plural Tuners With Different Numbers of Antennae", file history of related U.S. Appl. No. 17/489,638, filed Sep. 29, 2021.

Clift et al., Techniques for ATSC 3.0 Broadcast Boundary Area Management Using Plural Tuners:, file history of related U.S. Appl. No. 17/488,274, filed Sep. 28, 2021.

Clift et al., "Techniques for ATSC 3.0 Broadcast Boundary Area Management Using Signal Duality and Packet Errors to Differentiate Between Duplicated Services on Different Frequencies During Scan", file history of related U.S. Appl. No. 17/487,753, filed Sep. 28, 2021.

Clift et al., "Techniques for Receiving Non-Real Time (NRT) Data Whilst Traversing a Multifrequency Network Boundary", file history of related U.S. Appl. No. 17/489,694, filed Sep. 29, 2021.

Goldberg et al., "ATSC 3 Application Context Switching and Sharing", file history of related U.S. Appl. No. 17/489,708, filed Sep. 29, 2021.

(56) References Cited

OTHER PUBLICATIONS

Goldberg et al., "ATSC 3 Reception Across Boundary Conditions Using Location Data", file history of related U.S. Appl. No. 17/489,732, filed Sep. 29, 2021.

S.—I. Park et al., "ATSC 3.0 Transmitter Identification Signals and Applications," in IEEE Transactions on Broadcasting, vol. 63, No. 1, pp. 240-249, Mar. 2017, doi: 10.1109/TBC.2016.2630268.

Y. T. Abdelrahman, R. A. Saeed and A. El-Tahir, "Multiple Physical Layer Pipes performance for DVB-T2,", 2017 International Conference on Communication, Control, Computing and Electronics Engineering (ICCCCEE), 2017, pp. 1-7, doi: 10.1109/ICCCCEE.2017.7867634.

Clift et al., "Techniques for ATSC 3.0 Broadcast Boundary Area Management Using Plural Tuners Handing Off Between Presentation and Scanning", related U.S. Appl. No. 17/489,675 Non-Final Office Action dated Jul. 28, 2022.

Clift et al., "Techniques for ATSC 3.0 Broadcast Boundary Area Management Using Plural Tuners Handing Off Between Presentation and Scanning", related U.S. Appl. No. 17/489,675, Applicant's response to Non-Final Office Action filed Oct. 10, 2022.

Clift et al., "Techniques for ATSC 3.0 Broadcast Boundary Area Management Using Plural Tuners With Different Numbers of Antennae", related U.S. Appl. No. 17/489,638, Non-Final Office Action dated Jun. 9, 2022.

Clift et al., "Techniques for ATSC 3.0 Broadcast Boundary Area Management Using Plural Tuners With Different Numbers of Antennae", related U.S. Appl. No. 17/489,638, Applicant's response to Non-Final Office Action filed Sep. 8, 2022.

Clift et al., Techniques for ATSC 3.0 Broadcast Boundary Area Management Using Plural Tuners; related U.S. Appl. No. 17/488,274, Non-Final Office Action dated Jul. 28, 2022.

Clift et al., Techniques for ATSC 3.0 Broadcast Boundary Area Management Using Plural Tuners; related U.S. Appl. No. 17/488,274, Applicant's response to Non-Final Office Action filed Oct. 10, 2022.

Clift et al., "Techniques for Receiving Non-Real Time (NRT) Data Whilst Traversing a Multi-frequency Network Boundary", related U.S. Appl. No. 17/489,694, Non-Final Office Action dated Sep. 29, 2022.

Clift et al., "Techniques for Receiving Non-Real Time (NRT) Data Whilst Traversing a Multifrequency Network Boundary", related U.S. Appl. No. 17/489,694, Applicant's response to NonFinal Office Action filed Oct. 10, 2022.

Clift et al., "Techniques for ATSC 3.0 Broadcast Boundary Area Management Using Signal Duality and Packet Errors To Differentiate Between Duplicated Services On Different Frequencies During Scan", related U.S. Appl. No. 17/487,753, Non-Final Office Action dated Nov. 16, 2022.

Goldberg et al., "ATSC 3 Reception Across Boundary Conditions Using Location Data", related U.S. Appl. No. 17/489,732 Non-Final Office Action dated Nov. 7, 2022.

Goldberg et al., "ATSC 3 Reception Across Boundary Conditions Using Location Data", related U.S. Appl. No. 17/489,732, Applicant's response to Non-Final Office Action filed Nov. 17, 2022.

\* cited by examiner

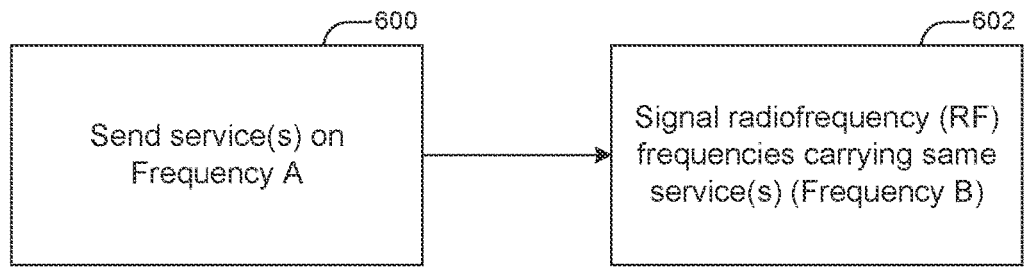
FIG. 6  Broadcaster/Transmitter
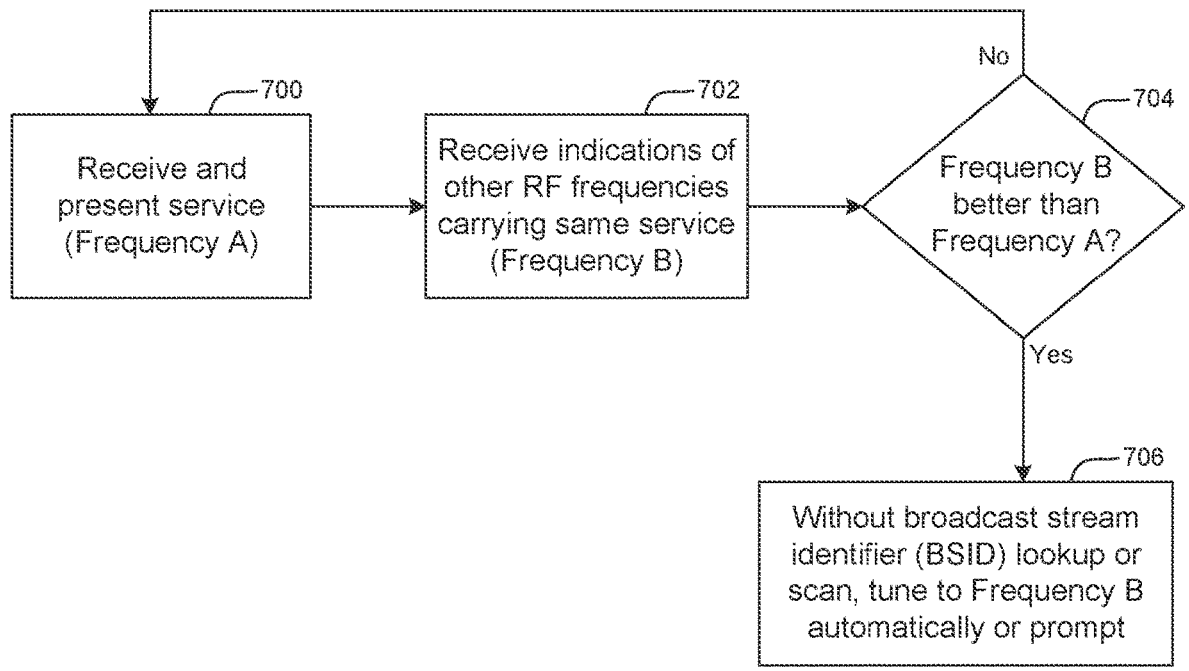
FIG. 7  Receiver

RF CHANNEL DESCRIPTION FOR MULTIPLE FREQUENCY NETWORKS

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard.

As understood herein, an ATSC 3.0 receiver scans for services including in reception areas that contain two or more frequencies carrying the same service, as may occur in a boundary region in which broadcast signals from two regional ATSC 3.0 broadcaster stations overlap. These boundary regions exist in a multifrequency network (MFN).

SUMMARY

As further understood herein, in ATSC 3.0 publication A/322, incorporated herein by reference, Section 9.3.2, an attribute referred to as "L1_detail" has RF frequency descriptions for channel bonding. But for multiple frequency networks, as described in A/331, incorporated herein by reference, Section B.13, the other broadcast stream identifier (BSID) is listed and not the corresponding RF frequency. To find the RF frequency of the other BSID, a database must be accessed to correlate BSID to RF frequency to look for similar Services.

As also understood herein, ATSC 3.0 offers the broadcast opportunity to share RF spectrum. Present principles understand that this means broadcasters can use one RF channel to send multiple services and use multiple RF channels to send one service. It is this latter use case, particularly compelling for mobile devices monitoring a service across multiple markets as they travel, to which present principles are directed.

Accordingly, in digital television having at least one boundary region in which at least one DTV receiver receives broadcast signals from at least first and second digital television broadcast assemblies, a method includes, using a digital television receiver, receiving a service list from at least one over-the-air (OTA) or over-the-top (OTT) transmitter. The method also includes using the digital television receiver for extracting, from the service list, correlations of plural service identifications with respective broadcast radiofrequency (RF) frequencies. Moreover, the method includes, at least in part using the correlations, selecting a first of at least two frequencies carrying a first service, and presenting on at least one audio video (AV) display the first service carried in the first frequency.

In some embodiments, the digital television receiver can include an advanced television systems committee (ATSC) 3.0 receiver, the service list can include an ATSC 3.0 Service List Table (SLT), and the service identifications can include ATSC 3.0 broadcaster service identifications (BSID).

In one example, the transmitter includes an OTA transmitter associated with at least one of the broadcast assemblies. In another example, the transmitter includes an OTT transmitter affiliated with at least one of the broadcast assemblies.

In a non-limiting embodiment, the method includes selecting the first frequency at least in part based on at least one quality metric of the first frequency being better than a quality metric of the second frequency.

If desired, the service list may include correlations of plural service identifications with respective broadcast RF frequencies for only broadcast regions adjacent each other. However, the service list alternately may include correlations of plural service identifications with respective broadcast RF frequencies for all broadcast regions in a nation.

In another aspect, a digital television apparatus includes at least one transmitter configured to transmit at least one service list, and in the service list, indicate at least a first correlation between at least a first service and at least a first radiofrequency (RF) frequency in a first broadcast region. The transmitter further is configured to, in the service list, indicate at least a second correlation between at least the first service and at least a second RF frequency in a second broadcast region. In this way, a receiver capable of receiving the service on both the first and second frequencies can present the first service by selecting the first or second frequency using the service list.

In another aspect, a digital television apparatus includes at least one receiver having at least one processor programmed with instructions to configure the processor to receive from at least one of a first digital television broadcaster or at least one of a second digital television broadcaster at least one service list. The instructions are executable to determine, using the service list, that at least a first service is associated with a first frequency from the first digital television broadcaster and that the first service also is associated with a second frequency from the second digital television broadcaster. The instructions are executable to select which of the first or second frequency to tune to in order to present the first service.

The details of the present application, both as to its structure and operation, can best be understood in reference to the accompanying drawings, in which like reference numerals refer to like parts, and in which:

BRIEF DESCRIPTION OF THE DRAWINGS

FIG. 6 illustrates example transmitter logic in example flow chart format consistent with present principles;

FIG. 7 illustrates example receiver logic in example flow chart format consistent with present principles;

DETAILED DESCRIPTION

Figure 1:
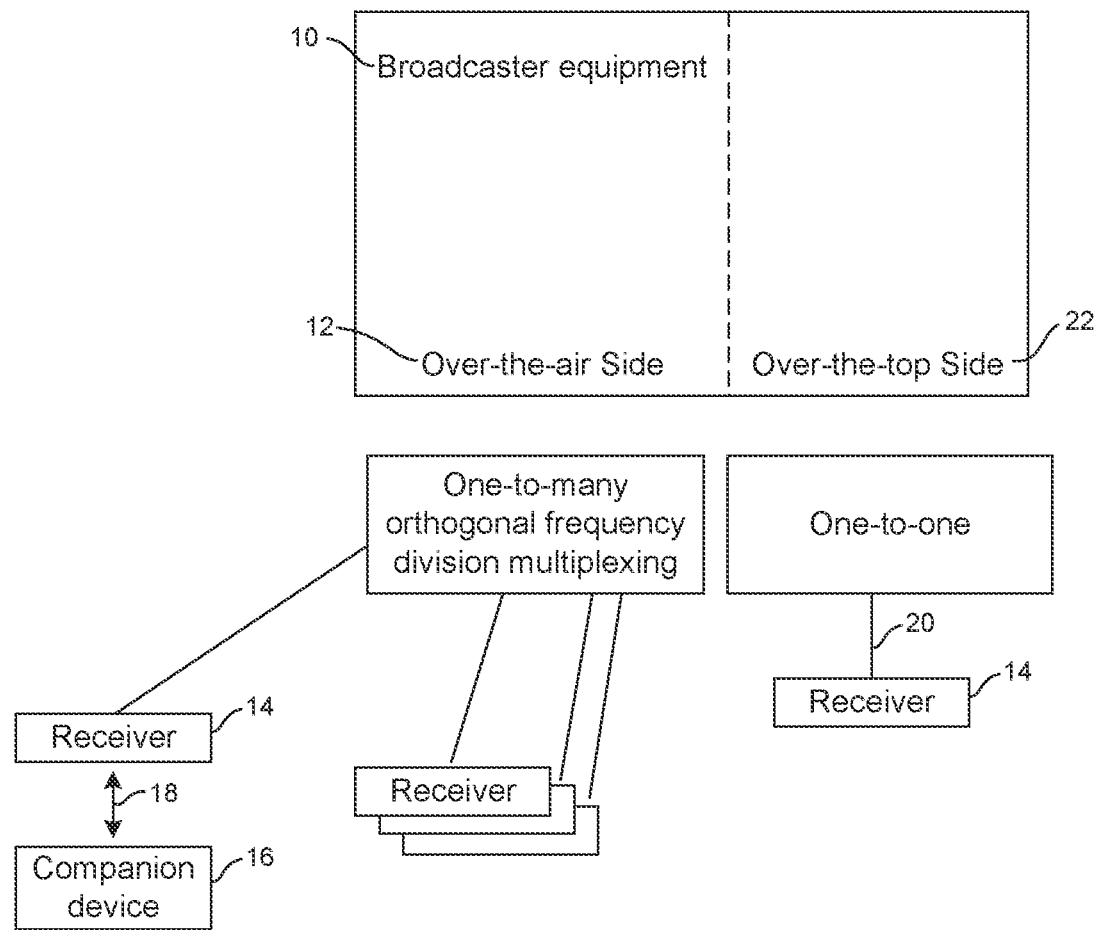
FIG. 1 illustrates an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 publication A/331, Annex B, section 13, incorporated herein by reference, may be particularly relevant to techniques described herein.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

A claim "having at least one of A, B, and C" (likewise "having at least one of A, B, or C" and "having at least one of A, B, C") includes alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
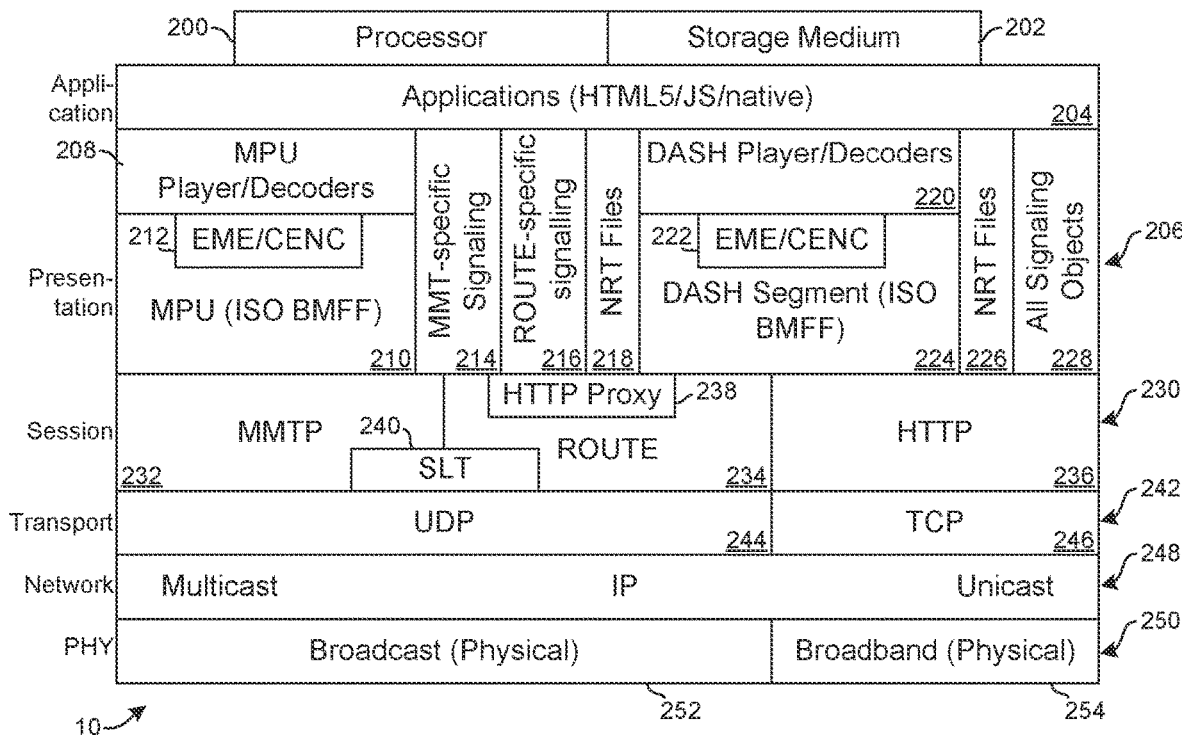
FIG. 2 illustrates components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MNT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high-definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
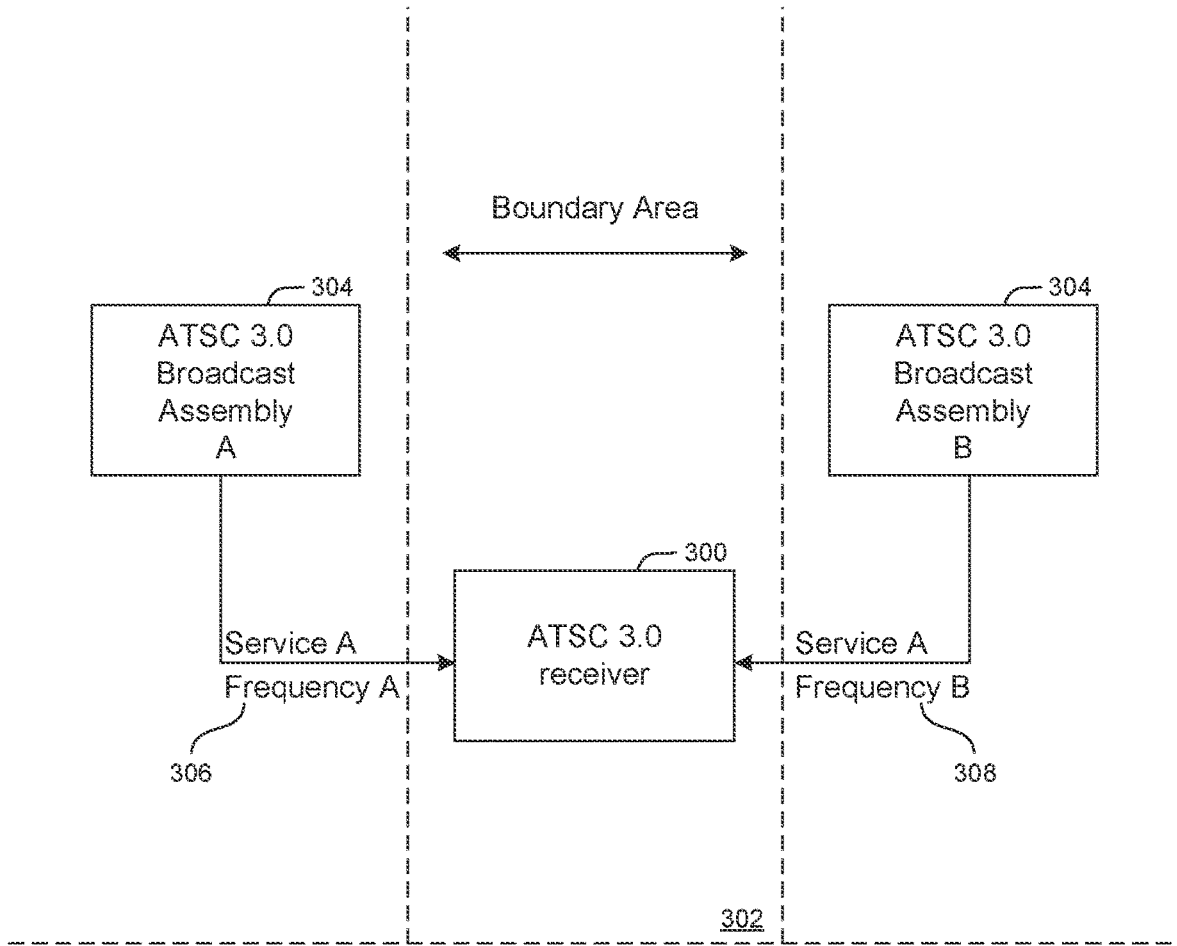
FIG. 3 illustrates an example specific system.

Now referring to FIG. 3, a simplified digital TV system such as an ATSC 3.0 system is shown. In FIG. 3, a mobile or stationary digital TV receiver such as an ATSC 3.0 receiver 300 that may include any or all of the relevant components discussed above in relation to FIGS. 1 and 2 is located in a boundary region 302 between first and second ATSC 3.0 broadcast stations or assemblies 304, with signals from both broadcast stations 304 being picked up by the receiver 300 in the region 302. A first ATSC 3.0 service ("Service A") is broadcast from the first broadcast station 304 over a first frequency 306, whereas the same service A is broadcast from the second broadcast station 304 over a second frequency 308 different from the first frequency 306. The receiver 300 picks up both frequencies, i.e., the receiver 300 picks up signals from both broadcast stations 304.

Figure 4:
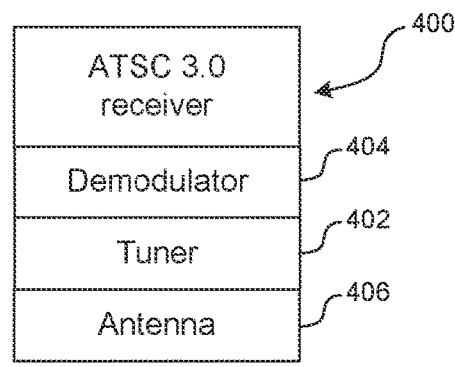
FIG. 4 illustrates a first example embodiment of a digital TV receiver.

FIG. 4 illustrates an example non-limiting embodiment of a digital TV receiver such as an ATSC 3.0 receiver 400 that may include any or all of the relevant components discussed above in relation to FIGS. 1 and 2. In the example shown, the ATSC 3.0 receiver 400 may be a stationary receiver, e.g., a receiver located inside a home. In some examples, the ATSC 3.0 receiver 400 may be a mobile receiver, e.g., as by being implemented in a mobile phone or being disposed in a moving vehicle.

The example ATSC 3.0 receiver 400 shown in FIG. 4 includes a tuner 402 sending signals to a demodulator 404 that the tuner picks up from one or more antennae 406. In the example shown, the receiver 400 includes one and only one tuner, one and only one demodulator, and one and only one antenna.

Figure 5:
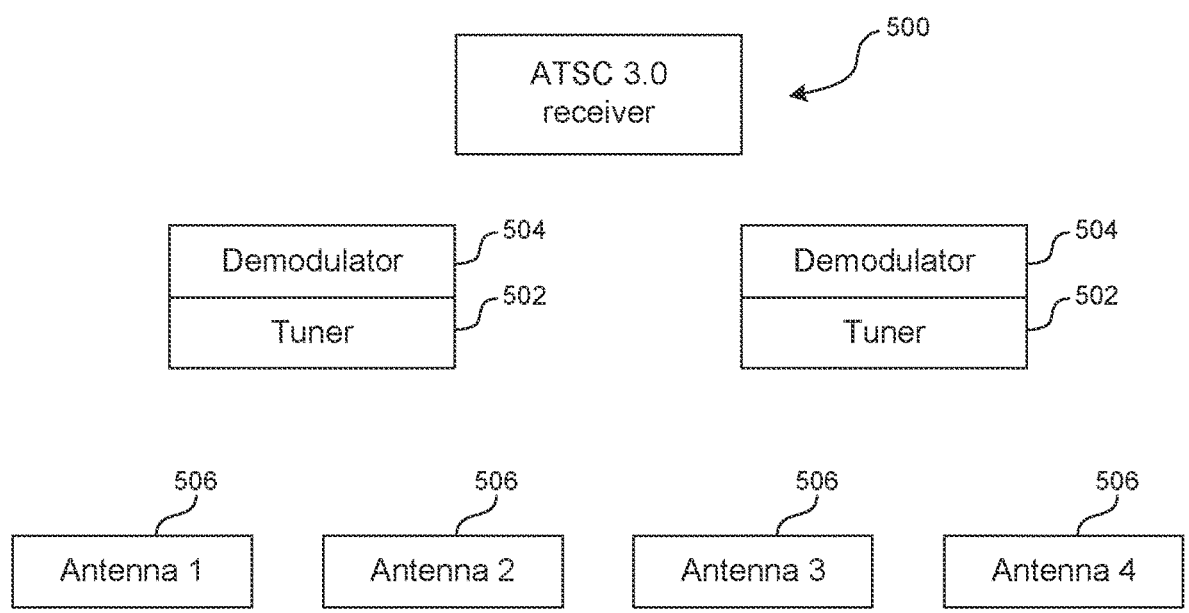
FIG. 5 illustrates a second example embodiment of a digital TV receiver.

In contrast, FIG. 5 illustrates an example non-limiting embodiment of a digital TV receiver such as an ATSC 3.0 receiver 500 that may include any or all of the relevant components discussed above in relation to FIGS. 1 and 2. In the example shown, the ATSC 3.0 receiver 500 may be a mobile receiver, e.g., as by being implemented in a mobile phone or being disposed in a moving vehicle. In some examples, the ATSC 3.0 receiver 500 may be a stationary receiver, e.g., a receiver located inside a home.

The example ATSC 3.0 receiver 500 shown in FIG. 5 includes plural tuners 502 sending signals to respective demodulators 504 picked up by the tuners from one or more antennae 506. In the non-limiting example shown, the ATSC 3.0 receiver 500 has two tuners and two demodulators, it being understood that the receiver may have a greater or lesser number of tuner/demodulators. In the non-limiting example shown, the ATSC 3.0 receiver 500 has four antennae, it being understood that the receiver may have a greater or lesser number of antennae. The receiver 500 may have the capability to switch antennae input to the tuners, such that a first tuner may receive signals from, e.g., three antennae and a second tuner may receive signals from the fourth antenna, and then a switch may be made to swap antenna input between the tuners. Two antennae may provide input to each respective tuner. All four antennae may provide input to a single tuner. These and other antenna-tuner configurations can be changed on the fly during operation as needed.

A physical layer pipe (PLP) is a portion of the RF channel which has certain modulation and coding parameters. More specifically, a single ATSC 3.0 broadcast RF channel can contain one or more logical channels, called PLPs, and each PLP can carry one or more audio video services. In addition, a single service can be carried by more than one PLP on more than one frequency. A lower level PLP can contain information (lower level signaling or LLS) regarding frequency scans, service identifiers (ServiceID), broadcast stream identifiers (BSID) and global session identifiers (GSID), and other information. Using the lower level PLP, higher level PLPs carrying AV services and related signaling (such as service layer signaling or SLS) can be identified.

A BSID can be tied through a database to a corresponding broadcast frequency on which a service, from the particular broadcaster associated with the BSID, can be received. Thus, a first BSID and related lookup information may indicate that a service can be received from a first broadcaster on a first frequency, and a second BSID and related lookup information may indicate that the same service may be received from a second broadcaster on a second, different frequency than the first frequency. Present principles, however, are directed to avoiding a database lookup to correlate BSIDs with frequencies.

Quality metrics of RF frequencies may be identified and stored. The quality metrics can include, e.g., signal to noise ratio (SNR) and error rate as may be represented by, e.g., packet error number (PEN). The quality metrics can include resolution, e.g., whether a service is in high definition (HD) or standard definition (SD). The quality metric also can include bitrate and form-factor, recognizing that not all HD is the same. The quality metrics can include content attributes such as whether a service supports foreign languages, accessibility signaling (e.g., where signing is being done), audio description, and other content aspects. The quality metrics can include locality preference (such as a first region channel being strong, but all the ads are for the first region and not a second region preferred by the user so that a duplicate service from the second region may be accorded preference over the first region). The quality metrics can include quality of user interfaces carried in the service.

In non-limiting examples SNR may be determined during the scan by noting both the received signal strength of each received frequency and any accompanying noise on that frequency and determining the quotient thereof. Error rate may be determined by, e.g., determining a percentage of packets missed (by noting missing packet numbers) and/or by determining a percentage of received packets with errors in them as determined by error correction algorithms.

FIGS. 6 and 7 illustrate a technique to provide a radiofrequency (RF) frequency description for multiple frequency networks so scanning of the related service does not need to happen and direct tuning can be achieved. Commencing at block 600 in FIG. 6, a transmitter such as an OTA transmitter or OTT transmitter sends services on one or more frequencies, including, in the example of FIG. 6, service "A" on frequency "A". Moving to block 602, the transmitter also sends ("signals") a service list of services and corresponding RF frequencies, e.g., in a service list table (SLT), example details of which are set forth further below. The service list may include service identifications including BSIDs and corresponding frequencies, including indication that the service "A" but on a different frequency "B" from a different broadcaster with a different BSID. A service list may include correlations of plural service identifications with respective broadcast RF frequencies for only broadcast regions adjacent each other. Or, a service list can include correlations of plural service identifications with respective broadcast RF frequencies for all broadcast regions in a nation.

Since the transmitters broadcast service lists that directly correlate services to RF frequencies, handoff of the same service between RF channels operating on respective, different frequencies is facilitated. Instead of having a receiver scan the RF channels looking for a similar service, present principles entail signaling the other available RF frequencies with similar services to reduce channel acquisition time of the other RF channels.

Absent present principles, sending a service list with only BSID values does not indicate RF frequency and FCC table look ups or some database needs to be maintained by the receiving devices to map BSID to RF frequency. This is more complex than needed. According to present principles, however, broadcasters can include frequencies in the service list that have the same, equivalent, or appropriate substitute service and can signal that. Present principles can be used to modify both the standards in A/331 and A/322 as disclosed below to indicate the similar service.

Modifications to A/322 Section 9.3 are shown below, maintaining the L1D_num_rf and L1D_bonded_bsid attribute syntax:

| Syntax | No. of Bits | Format |
| --- | --- | --- |
| L1_Detail_signaling( ) { | | |
|   L1D_version | 4 | uimsbf |
|   L1D_num_rf | 3 | uimsbf |
|   for (L1D_rf_id=1 .. L1D_num_rf) { | | |
|     L1D_bonded_bsid | 16 | uimsbf |
|     Reserved | 3 | Bslbf |
|   } | | |

FIG. 7 illustrates receiver logic consistent with present principles. Commencing at block 700, a first service carried on a first frequency from a broadcaster is received and presented on an AV device. Proceeding to block 702, the receiver acquires the service list and uses it to identify other RF frequencies from neighboring broadcasters carrying the first service, typically on a different frequency ("frequency B"). If it is determined by the receiver at decision diamond 704 that the second frequency (B, in this example) has higher signal quality than the first frequency (A) using one or more of the quality metrics described herein for example, the receiver executes a handoff of presenting the first service from frequency A to presenting that service as received on frequency B at block 706. Otherwise, the receiver continues presenting content from the first frequency (A) at block 700.

Figure 8:
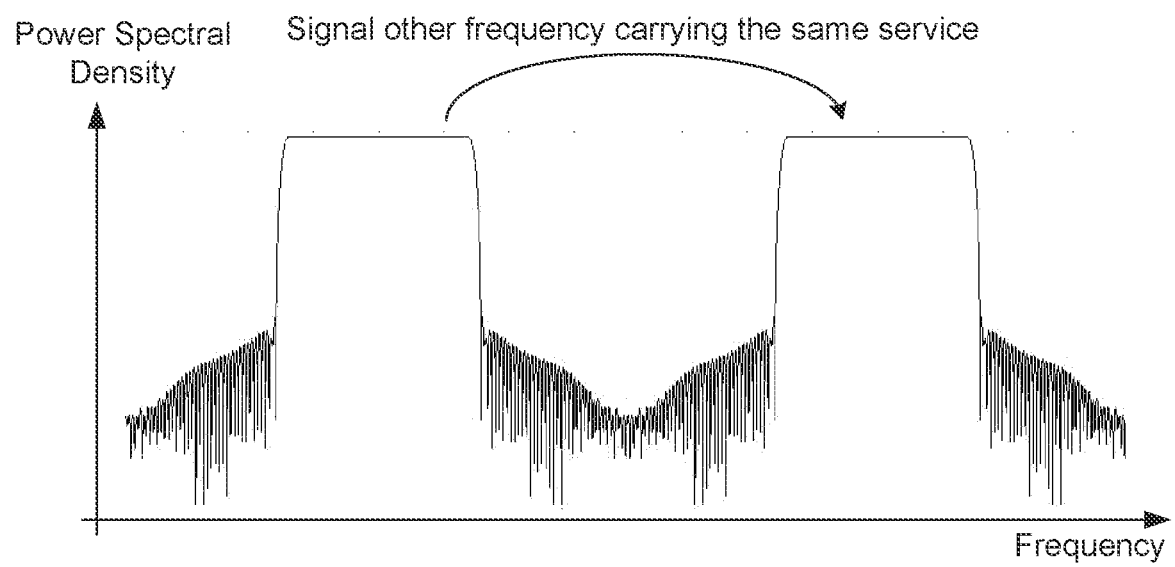
FIG. 8 illustrates signaling other frequencies carrying the same service.

FIG. 8 illustrates frequencies 800 being broadcast form multiple transmitters in a multi-frequency network (MFN) from low to high on the x-axis with the y-axis indicating power spectral density. Signaling 802 from a first transmitter may indicate its services and corresponding RF frequencies as well as the services and corresponding RF frequencies of neighboring transmitters or all transmitters in a nation to receivers within range of the first transmitter.

Figure 9:
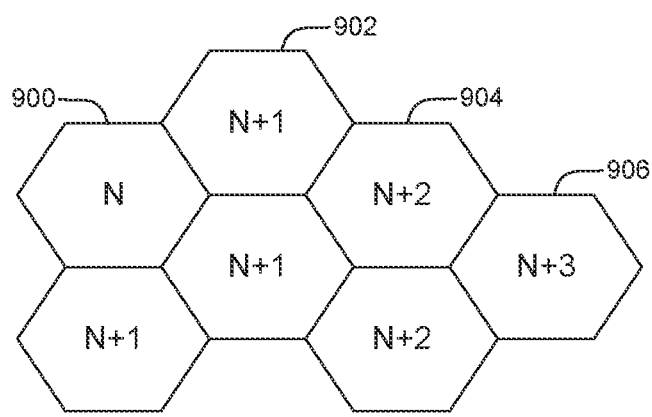
FIG. 9 illustrates digital TV broadcast markets.

FIG. 9 illustrates that broadcast markets 900 can be adjacent to each other as a hex pattern. Note that three bits (representing seven values) of alternative frequencies can indicate the immediate local frequencies providing the same service. Nationwide service can be signaled across adjacent (N+1) markets 902 only, not (N+2) adjacent markets 904. The N+2 market 904 can signal the N+1 market 902 and N+3 market 906. This allows a 'cellularization' of adjacent broadcast towers across the nation.

In A/322 Section 9.3.2, the L1D_num_rf and L1D_bonded_bsid attributes semantic may be accorded multiple purposes. Specifically, the above attributes can include same service sharing to account for the same service (as indicated by a service ID such as but not limited to the same GSID) appearing in different frequencies (Multi-frequency Network operation).

In a specific example, the L1D_num_rf attribute can indicate the number of frequencies involved in either channel bonding, or service sharing not including the frequency of the present channel. The attribute L1D_num_rf may have a maximum value of one (bonding of the current channel with one other channel) for channel bonding. On the other hand, for service sharing, the L1D_num_rf attribute can have a maximum value of seven, indicating the number of adjacent local frequencies with the same service. The attribute value L1D_num_rf=0 can indicate that channel bonding or service sharing is not used for the current frame.

In a specific example, the field L1D_bonded_bsid can indicate the BSID of a separate RF channel that is either channel bonded or service sharing with the current RF channel, and that is associated with the implicit ID of L1D_rf id. The BSID of the current channel may be represented by L1D_bsid.

In A/331, the SLT can provide the links between BSID and channel frequencies. The signaled adjacent frequencies can either be all of them in a nation, or a subset of local frequencies nearest a broadcaster. The pattern is indicated in FIG. 9. Each broadcast tower's GPS latitude/longitude coordinates can be indicated.

In specific examples, an ATSC 3.0 standard such as, by way of example only, A/331 Sec. 5.8.1, first bullet may indicate that each ATSC 3.0 service represented by either service portions or duplicates shall be included in SLTs of the RF channels in which the portions or duplicates appear. Each of these multiple listings of a Service, referencing its portions or duplicates, can have the same value of Service ID. The specification may omit to state that each of these multiple listings of a service, referencing its portions or duplicates can have the same value of major/minor channel number. This consistency of values enables the multiple portions or duplicates of a service carried in multiple RF channels to be consolidated into a single service in the channel map of receivers when they perform channel scans. The SLT entry for an essential portion or any duplicate of such a service also may have one or more OtherBsid element(s) indicating the BSID(s) of the Broadcast Stream(s) in which the other portion(s) or duplicate(s) can be found. The standard may omit to say that when all service portions or duplicates are delivered without channel bonding, the values of SLT@bsid attribute(s) and SLT.Service.OtherBsid element(s) shall not be formatted as a list of unsigned short value or values.

The underlined subject matter in the table below indicates syntax to be added to the SLT described in A/331 Sec. 6.3.1.

| | | | |
|---|---|---|---|
| OtherBsid | 0..N | slt:listOfUnsignedShort | Identifier(s) of other Broadcast Stream(s) that deliver duplicates or portions of this Service. |
| @type | 1 | unsignedByte | Indicates whether the Broadcast Stream identified by the OtherBsid delivers a duplicate or a portion of this Service. |
| OtherRf | 0..N | | Supplies details about the transmission location and strength of other broadcasts which are indicated in SLT.Service.OtherBsid |
| @OtherBsidRf | 1 | unsignedShort | Indicates the center channel RF frequency (in MHz) of the broadcast with the broadcast identifier of SLT.Service.OtherRf@OtherBsid. |
| @otherBsid | 1 | unsignedShort | Identifier of the Broadcast Stream broadcast on OtherRf. Linkage between SLT.Service.OtherBsid and SLT.Service.OtherRf is via the value of otherBsid. |
| @lat | 1 | decimal | Latitude of transmitter location (−90.0 ≤ lat ≤ 90.0) |
| @long | 1 | decimal | Longitude of transmitter location (−180.0 ≤ long ≤ 180.0) |
| @elev | 1 | integer | Antenna radiation center Height Above Mean Sea Level (nearest meter) |
| @erp | 1 | integer | Antenna Effective Radiated Power (ERP), in kW |
| Directional | 0..N | | Describes the directionality of the transmitter/antenna |
| @heading | 1 | nonNegativeInteger | Heading in degrees, 0 ≤ @heading < 360 |
| @strength | 1 | float | The relative field value of the emission in the direction of @heading |

In A/331 Sec. 6.3.2, SLT semantics, the below changes may be made as shown. Some or all of the underlined material may be added.

OtherBsid—Each instance of this list of unsigned short integer values can indicate an identifier of another Broadcast Stream that delivers a duplicate or a portion of this Service. The format of each instance of OtherBsid can be identical to the format of @bsid. At least one OtherBsid element can be present when the @essential attribute is present for the parent Service element and is set to "true". No OtherBsid element can be present when the @essential attribute is present for the parent Service element and is set to "false". One or more OtherBsid elements with @type equal to "1" may be present when @essential attribute is not present for the parent Service element. There is no default value when OtherBsid element is not present.

@type—This unsigned byte integer value can indicate whether the Broadcast Stream identified by the OtherBsid delivers a duplicate or a portion of this Service according to Table 6.6. When the value of @type is set to "2", this indicates that this Service element represents a portion of a Service which has components in the Broadcast Stream identified by the identifier OtherBsid and whose Service identifier is given by the value of the @serviceId attribute of the parent Service element. When more than one OtherBsid element are present under its parent Service element, the OtherBsid@type attribute values of all these elements can be equal. When the value of @type is set to "3", at least one OtherRf element corresponding to OtherBsid can be present.

| Code Values for SLT.Service.OtherBsid@type | |
|---|---|
| type | Meaning |
| 0 | ATSC Reserved |
| 1 | Duplicate |
| 2 | Portion |
| 3 | MFN Cooperating/Appropriate Alternative service[1] |
| 4-255 | ATSC Reserved |

[1]This standard makes no requirements on what constitutes an alternative Service to this Service OtherRf—This optional field supplies details about the transmission location and strength of other broadcasts which are indicated in SLT.Service.OtherBsid. In the case where there are multiple BSID values (e.g., a bonded pair), there can be one OtherRf field per BSID. In the case where there are multiple transmitters per BSID (e.g., a Single Frequency Network), there can be one OtherRf field per transmitter. Note that the OtherRf field describes a single transmitter, and thus there can be one or more OtherRf fields per OtherBsid, and some services have multiple values in SLT.Service.OtherBsid (e.g., bonded channels) which yield one OtherRf data structure (e.g., one per BSID in the bonded set).

OtherRf@OtherBsidRF—this unsigned short integer value can indicate the center frequency in MHz of an RF emission which carries the Broadcast Stream identified by the OtherRf@OtherBsid value.

OtherRf@OtherBsid—This unsigned short integer value can indicate identifier of the broadcast stream that is described by this OtherRf field. There is no default value when OtherBsid element is not present.

OtherRF@lat, OtherRF@long—These fields can indicate the location of the transmitter, on RF frequency @otherBsidRf. These fields can be in the range of −180.0 to 180.0, indicating degrees & fraction of a degree (not degrees, minutes, seconds) of the latitude or longitude of a transmitter location (respectfully)

OtherRF@elev—This field can indicate the antenna radiation center in Height Above Mean Sea Level to the nearest meter of the transmitter emitting on RF frequency @otherBsidRf OtherRF@erp—This attribute can indicate the Effective Radiated Power of the transmitter in kW on RF frequency @otherBsidRf.

OtherRF.Directional—This optional field describes the relative field strength of the broadcast emission at one or more compass points. Typically, this is due to a directional broadcast antenna. Note that if this field is provided, it should include at least 8 entries (e.g., N, NE, E, SE, S, SW, W, NW), and note also that regional regulatory authorities may provide this information (e.g., the in the US, the FCC regulatory database contains directional data at every 10°).

OtherRF.Directional@heading—This field can indicate the heading, in degrees, described by @strength. This field can be in the range 0<heading <360.

OtherRF.Directional@strength—This field can indicate the relative strength of the signal in direction @heading For example, WJLA-TV participating in an MFN may be described as:

<OtherBsid type=3>532</OtherBsid>
<OtherRf OtherBsid=532 OtherBsidRF=179 lat=38.950278 long=77.079444 elev=310 erp=52/>

For further example, if WJLA-TV is participating in channel bonding with WIAV-TV:

<OtherBsid type=?2?>532 9100</OtherBsid>
<OtherRf OtherBsid=532 OtherBsidRF=179 lat=38.950278 long=77.079444 elev=310 erp=52/>
<OtherRf OtherBsid=9100 OtherBsidRf=569 lat=38.940056 long=77.08125 elev=220 erp=48/>

If WJLA was a SFN with three transmitters:

<OtherBsid type=3>532</OtherBsid>
<OtherRf OtherBsid=532 OtherBsidRF=179 lat=38.950278 long=77.079444 elev=310 erp=52/>
<OtherRf OtherBsid=532 OtherBsidRF=179 lat= . . . . />
<OtherRf OtherBsid=532 OtherBsidRF=179 lat= . . . . />

For further example, WXYZ-TV participating in an MFN may be identified as:

<OtherBsid type=3>
1484
</OtherBsid>
<OtherRf otherBsid=1484 OtherBsidRF=539 lat=42.470556 long=−83.250278 elev=516 erp=765/>
  <Directional heading=0 strength=0.85/>
  <Directional heading=10 strength=0.837/>
  <Directional heading=20 strength=0.846/>
  <Directional heading=30 strength=0.848/>
  <Directional heading=40 strength=0.820/>
  <Directional heading=50 strength=0.771/>
  <Directional heading=60 strength=0.740/>
  <Directional heading=70 strength=0.752/>
  <Directional heading=80 strength=0.789/>
  <Directional heading=90 strength=0.819/>
  <Directional heading=100 strength=0.826/>
  <Directional heading=110 strength=0.820/>
  <Directional heading=120 strength=0.814/>
  <Directional heading=130 strength=0.812/>
  <Directional heading=140 strength=0.812/>
  <Directional heading=150 strength=0.812/>
  <Directional heading=160 strength=0.814/>
  <Directional heading=170 strength=0.820/>
  <Directional heading=180 strength=0.826/>
  <Directional heading=190 strength=0.819/>
  <Directional heading=200 strength=0.789/>
  <Directional heading=210 strength=0.752/>
  <Directional heading=220 strength=0.740/>
  <Directional heading=230 strength=0.771/>
  <Directional heading=240 strength=0.820/>
  <Directional heading=250 strength=0.848/>
  <Directional heading=260 strength=0.846/>
  <Directional heading=270 strength=0.837/>
  <Directional heading=280 strength=0.850/>
  <Directional heading=290 strength=0.892/>
  <Directional heading=300 strength=0.944/>
  <Directional heading=310 strength=0.985/>
  <Directional heading=320 strength=1.000/>
  <Directional heading=330 strength=0.985/>

```
<Directional heading=340 strength=0.944/>
<Directional heading=350 strength=0.892/>
</OtherRf>
```

It will be appreciated that whilst present principals have been described with reference to some example embodiments, these are not intended to be limiting, and that various alternative arrangements may be used to implement the subject matter claimed herein.

What is claimed is:

1. In digital television comprising at least one boundary region in which at least one DTV receiver receives broadcast signals from at least first and second digital television broadcast assemblies, a method, comprising:
  using a digital television receiver, receiving a service list from at least one over-the-air (OTA) or over-the-top (OTT) transmitter;
  using the digital television receiver, extracting, from the service list, correlations of plural service identifications with respective broadcast radiofrequency (RF) frequencies;
  at least in part using the correlations, selecting a first of at least two frequencies carrying a first service; and
  presenting on at least one audio video (AV) display the first service carried in the first frequency.

2. The method claim 1, wherein the digital television receiver comprises an advanced television systems committee (ATSC) 3.0 receiver.

3. The method of claim 1, wherein the service list comprises an advanced television systems committee (ATSC) 3.0 Service List Table (SLT).

4. The method of claim 1, wherein the service identifications comprise advanced television systems committee (ATSC) 3.0 broadcast stream identifiers (BSID).

5. The method of claim 1, wherein the transmitter comprises an OTA transmitter associated with at least one of the broadcast assemblies.

6. The method of claim 1, wherein the transmitter comprises an OTT transmitter affiliated with at least one of the broadcast assemblies.

7. The method of claim 1 comprising selecting the first frequency at least in part based on at least one quality metric of the first frequency being better than a quality metric of the second frequency.

8. The method of claim 1, wherein the service list comprises correlations of plural service identifications with respective broadcast RF frequencies for only broadcast regions adjacent each other.

9. The method of claim 1, wherein the service list comprises correlations of plural service identifications with respective broadcast RF frequencies for all broadcast regions in a nation.

10. A digital television apparatus comprising:
  at least one transmitter configured to:
  transmit at least one service list;
  in the service list, indicate at least a first correlation between at least a first service and at least a first radiofrequency (RF) frequency in a first broadcast region; and
  in the service list, indicate at least a second correlation between at least the first service and at least a second RF frequency in a second broadcast region, to enable a receiver capable of receiving the service on both the first and second frequencies to present the first service by selecting the first or second frequency using the service list.

11. The digital television apparatus of claim 10, wherein the transmitter comprises an advanced television systems committee (ATSC) 3.0 transmitter.

12. The digital television apparatus of claim 10, wherein the service list comprises an advanced television systems committee (ATSC) 3.0 Service List Table (SLT).

13. The digital television apparatus of claim 10, wherein the service list comprises advanced television systems committee (ATSC) 3.0 broadcast stream identifiers (BSID).

14. The digital television apparatus of claim 10, wherein the transmitter comprises an over-the-air (OTA) transmitter.

15. The digital television apparatus of claim 10, wherein the transmitter comprises an over-the-top (OTT) transmitter.

16. The digital television apparatus of claim 10, wherein the service list comprises correlations of plural service identifications with respective broadcast RF frequencies for only broadcast regions adjacent each other.

17. The digital television apparatus of claim 10, wherein the service list comprises correlations of plural service identifications with respective broadcast RF frequencies for all broadcast regions in a nation.

18. A digital television apparatus comprising:
  at least one receiver comprising at least one processor programmed with instructions to configure the processor to:
  receive from at least one of a first digital television broadcaster or at least one of a second digital television broadcaster at least one service list;
  determine, using the service list, that at least a first service is associated with a first frequency from the first digital television broadcaster and that the first service also is associated with a second frequency from the second digital television broadcaster; and
  select which of the first or second frequency to tune to in order to present the first service.

19. The digital television apparatus of claim 18, wherein the instructions are executable by the processor to:
  select the first or second frequency based at least in part on at least one quality metric.

20. The digital television apparatus of claim 18, wherein the service list comprises an advanced television systems committee (ATSC) 3.0 Service List Table (SLT).

* * * * *